March 23, 1937.   H. L. ADAMS   2,074,766
BODILY MOVABLE PLANE
Original Filed April 14, 1921
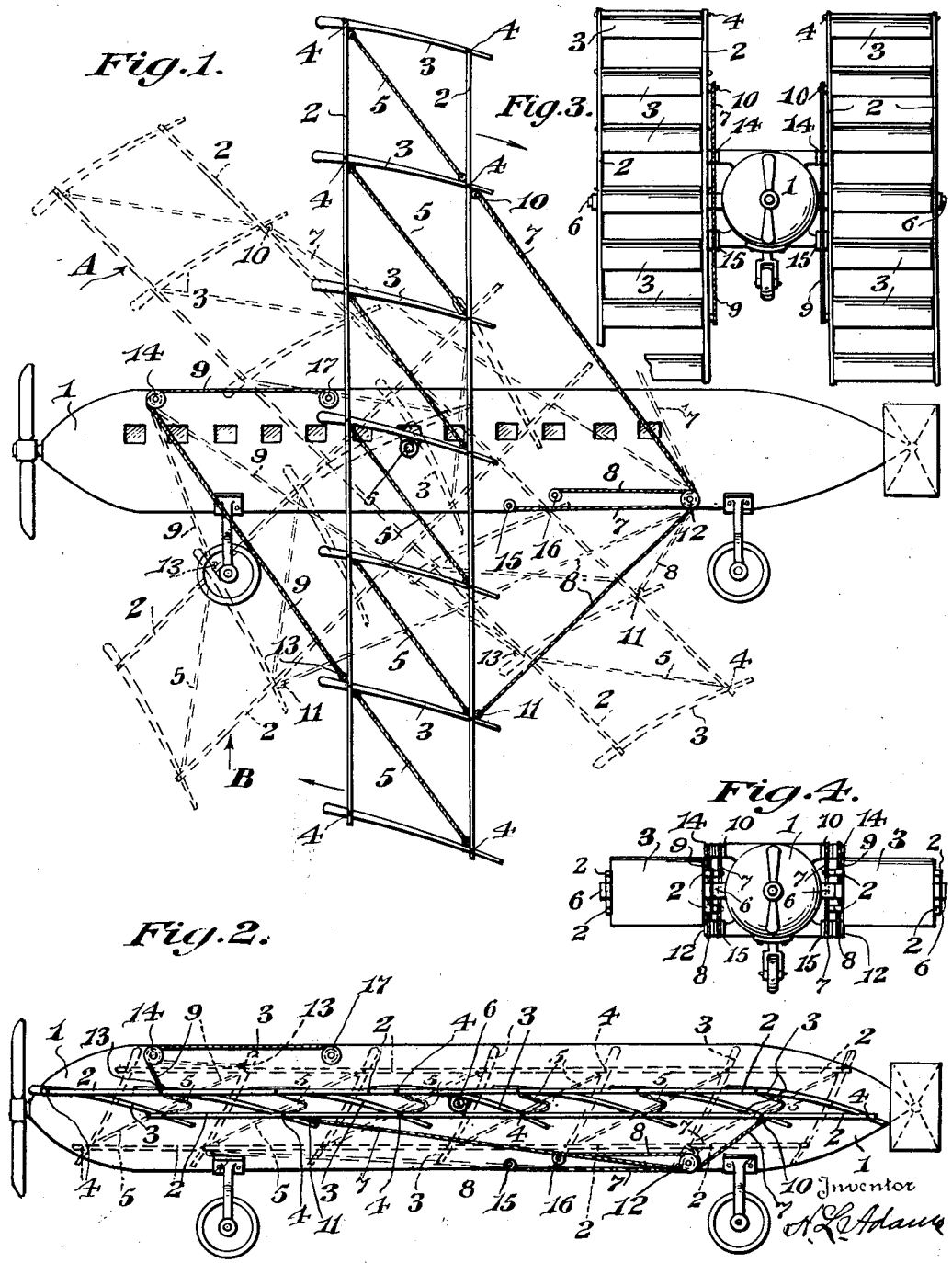

Patented Mar. 23, 1937

2,074,766

UNITED STATES PATENT OFFICE 2,074,766

BODILY MOVABLE PLANE

Herbert Luther Adams, Washington, D. C.

Original application April 14, 1921, Serial No. 461,412. Divided and this application November 22, 1932, Serial No. 644,563

7 Claims. (Cl. 244—48)

This invention relates to flying machines, and the application is a division of my prior application, Serial Number 461,412, filed April 14, 1921, and since maturing into Patent No. 1,888,418.

More particularly, the invention relates to a multiple plane wing structure primarily adapted for use in connection with aircraft of the type lighter than air.

One of the objects of the invention is to provide such a wing structure that may be shifted in a pivoted manner with respect to the flying machine, independently of any shifting of the individual planes with respect to their mountings, in order that the angle of incidence of the planes may be altered to increase or decrease the lifting effect thereof.

Another object of the invention is to provide a wing structure of the character aforesaid in which the individual planes may be shifted with respect to their mountings, independently of any movement of the wing structure as a unit, in order that the angle of incidence of the planes may be altered as desired.

Another object of the invention is to provide a multiple plane wing structure as aforesaid that may be utilized to directly retard forward movement of the machine with which it is employed.

Another object of the invention is to provide a wing structure of the character aforesaid which may be utilized as an aid in steering a flying machine.

An embodiment of the invention is illustrated in the accompanying drawing, in which:

Figure 1 is a side elevation of a flying machine embodying my improved wing structure shown in various positions.

Figure 2 is a similar view showing the wing structure parallel to the flying machine in both collapsed and open positions.

Figure 3 is a reduced front elevation showing the full line position of the wing structure in Figure 1.

Figure 4 is a reduced front elevation of Figure 2.

Referring to the drawing in detail, the numeral 1 indicates the body of a flying machine having a wing structure in accordance with this invention pivotally mounted at each side thereof. Each wing structure includes a plurality of parallel supports 2 arranged in the form of a rectangle, and connected together by means of a plurality of spaced, parallel planes 3. The planes 3 preferably are slightly arcuate in form, and are pivotally connected to the supports adjacent, but spaced from, the front and rear limits of the supports when the latter are disposed vertically as shown in full lines in Figure 1. The pivotal connections between the planes 3 and supports 2 are indicated at 4. Preferably the supports 2 are further connected by means of flexible braces or guys 5 which extend diagonally of the spaces between adjacent planes, but out of vertical alinement with the planes.

The body 1 is provided at each side thereof with a bearing 6 upon which a wing structure is rotatably mounted. The bearing 6 may be of any suitable construction to relieve strain and friction. Preferably each wing will be connected with its bearing 6 by rotatably mounting the centermost plane 3 of the wing on the bearing. As will be readily seen, the wing structure may be collapsed as shown in full lines in Figure 2, or opened as shown in Figure 1 by moving the supports 2 on opposite sides of the bearing 6 lengthwise and in opposite directions. Likewise the entire wing structure as a unit may be tilted to assume various positions as shown in Figures 1 and 2.

The means herein shown for controlling the position of each wing as a unit with respect to the body 1, and of the planes 3 of each wing with respect to each other consists of lines 7, 8 and 9. The lines 7 and 8 are connected to one of the inner supports at 10 and 11 respectively, and extend in opposite directions over a double pulley 12 rotatably mounted on the body 1 below the center line thereof, and in spaced relation to the rear end thereof. The line 9 is connected at 13 to the inner support 2 opposite the one to which the line 8 is connected, and passes over a pulley 14 rotatably mounted on the body 1 above the center line thereof, and in spaced relation to the front end thereof. From the pulleys 12 and 14, the lines 7, 8 and 9 pass over suitable guide means such as the direction changing pulleys 15, 16 and 17, and then extend to a position within the ready reach of an operator.

In operation, assuming the wing structure to be in the position shown in full lines in Figure 1, and that it is desired to move it to the dotted line position designated A, a pull is exerted on line 8, with line 9 released and line 7 held sufficiently taut to prevent collapsing of the structure. The entire wing may be moved in this manner as a unit with no relative movement between the planes 3 and supports 2. During this movement, the projecting portions of the wing structure describe a vertical arc extending lengthwise of the body 1. If it is desired to collapse the wing structure while in the position indicated at A, this may be done by pulling on the lines 7 and 9 which moves the front and rear supports 2 in opposite directions, and causes pivotal movement between the supports 2 and planes 3, with the latter moving toward each other, and with the front and rear edges of the planes moving relatively. This can only be done by lengthening guys 5. To move the structure from the full line position to the dotted line B position, the line 7 is pulled while the line 8 is held sufficiently taut to prevent collapse of the structure. If it is desired to collapse the structure in this position, the line 8 is pulled, with the line 7 released, and the line 9 held taut.

If it is desired to move the structure from the full line position of Figure 1 to the dotted line position of Figure 2, the line 9 is pulled while the lines 7 and 8 are held in balance to prevent sliding movement of the supports 2. To collapse the structure to the full line position of Figure 2, the line 8 is pulled, with the line 7 released, and the line 9 held fast.

It will be apparent that by selected manipulation of the lines 7, 8 and 9, the wing structure may be moved to any position desired in accordance with flying conditions. Ordinarily the wing structures on opposite sides of the body 1 will be similarly operated in unison, although they may be moved independently and differently as an aid in steering the flying machine. Additional control lines might be added if desired, for example, there might be provided a duplicate of the line 9 extending upwardly from the pulley 14. Also the device might be operated by suitable gearing, but there must be some means for selectively moving the planes relative to their mountings, or moving the entire structure as a unit.

It will be readily apparent that the angle of incidence of each wing structure may be altered at will, either by collapsing or partially collapsing the structure, or any moving the same as a unit about its bearing 6. The planes 3 may be disposed vertically to offer maximum resistance to forward flight, or may be disposed horizontally to provide a maximum lifting surface, as desired, and may be changed quickly from one position to the other.

Having described my invention, what I claim to be new, and desire to secure by Letters Patent, is:

1. In a flying machine, a body, and a wing structure pivoted to one side of the body to move in a vertical arc lengthwise of the body as a unit, said wing structure including a plurality of superposed planes capable of movement to vary the angle of incidence thereof independently of any pivotal movement of the wing structure as a unit.

2. In a flyinb machine, a body, a trunnion attached to said body, a plurality of elongated supports, a plurality of superposed planes pivoted adjacent their front and rear edges to said supports, and means for rotatably mounting one of said planes on one trunnion on one side of said body.

3. In a flying machine, a body, a plurality of elongated supports, a plurality of superposed planes pivoted adjacent their front and rear edges to said supports, means for rotatably mounting one of said planes on one side of the body, means for moving said planes and supports in an arc as a unit to vary the angle of attack of the planes, and means for moving certain of said supports lengthwise in opposite directions to vary the angle of incidence of said planes.

4. In a flying machine, body, a plurality of elongated supports, a plurality of superposed planes pivoted adjacent their front and rear edges to said supports, means for rotatably mounting one of said planes on one side of the body, a pair of oppositely extending control lines secured to one of said supports at one side of said rotatably mounting means for one of said planes, and a control line secured to one of said supports at the opposite side of said rotatably mounting means for one of said planes.

5. In a flying machine, a body, a plane supported on the body, means for moving the plane in a vertical arc lengthwise of the body to vary the angle of incidence of the plane and also the position of the plane lengthwise of the body, and means for relatively moving the front and rear edges of the planes as a unit to vary the angle of incidence thereof without changing its position lengthwise of the body.

6. In a flying machine, a body, a pair of wing structures pivoted to opposite sides of the body, each of said wing structures including a plurality of superposed planes, means for selectively moving said wing structures as units in vertical arcs lengthwise of the body, and means for relatively moving the front and rear edges of the planes of said wing structures on either side of said body as a unit without relative movement of said wing structures in said vertical arcs.

7. In a flying machine, a body, trunnions passing through and attached to the body, a plane pivoted on said trunnion on each side of said body, a plurality of elongated supports attached to outer edges of said pivoted plane, a plurality of planes pivoted adjacent their front and rear edges to said supports, and means for rotatably moving said plurality of planes about said trunnion and stopping said rotary movement, means for moving said supports on opposite sides of said trunnion in opposite directions to those on the other side.

HERBERT L. ADAMS.